(12) United States Patent
Wilmot, Jr. et al.

(10) Patent No.: US 6,415,595 B1
(45) Date of Patent: Jul. 9, 2002

(54) INTEGRATED THERMAL MANAGEMENT AND COOLANT SYSTEM FOR AN AIRCRAFT

(75) Inventors: George E. Wilmot, Jr., East Granby, CT (US); Gregory M. Ott, Feeding Hills, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 09/643,996

(22) Filed: Aug. 22, 2000

(51) Int. Cl.[7] ................................................ F02C 7/08
(52) U.S. Cl. ...................... 60/39.07; 60/730; 60/736; 60/266
(58) Field of Search ........................... 60/39.02, 39.07, 60/226.1, 262, 730, 736, 39.83, 266

(56) References Cited

U.S. PATENT DOCUMENTS

| | | | |
|---|---|---|---|
| 4,474,001 A | 10/1984 | Griffin et al. ................. | 60/204 |
| 4,505,124 A | 3/1985 | Mayer ........................ | 62/180 |
| 4,696,156 A | 9/1987 | Burr et al. ................. | 60/39.08 |
| 4,991,394 A | 2/1991 | Wright ...................... | 60/226.1 |
| 5,014,518 A | 5/1991 | Thomson et al. ............. | 62/88 |
| 5,299,763 A | 4/1994 | Bescoby et al. ......... | 244/118.5 |
| 5,392,595 A | * 2/1995 | Glickstein et al. ......... | 60/39.02 |
| 5,414,992 A | 5/1995 | Glickstein ................. | 60/39.02 |
| 5,511,374 A | * 4/1996 | Glickstein et al. ......... | 60/39.02 |
| 6,182,435 B1 | * 2/2001 | Niggemann et al. ....... | 60/39.02 |
| 6,282,881 B1 | * 9/2001 | Beutin et al. .............. | 60/39.08 |

FOREIGN PATENT DOCUMENTS

| | | |
|---|---|---|
| EP | 0888966 | 1/1999 |
| GB | 2095756 | 10/1982 |
| GB | 2131094 | 6/1984 |
| WO | WO 99/32357 | 7/1999 |

* cited by examiner

Primary Examiner—Charles G. Freay

(57) ABSTRACT

A thermal management system avoids problems associated with the recirculation of fuel through a fuel tank on an aircraft in a system that includes a fuel reservoir (70), a pump (72) for pumping fuel from the reservoir (70) to a first heat load (74) and then to a check valve (76) to a junction (78). At least one second heat load (80), (82), (84) is connected to the junction (78) and a fuel/fan air heat exchanger (104) having a fan air flow path in heat exchange relation with a fuel flow path having a fuel discharge end (106) connected to the junction (78). The fan air flow path is adapted to be connected to receive compressed air from the fan (30) of an engine (10). A bleed air/fuel heat exchanger (92) receives fuel from the second heat load and bleed air from the engine (10) and is connected to deliver fuel to the engine (10). A control valve (86) is interposed between the second heat load and the engine (10) for proportioning the flow of fuel to the engine (10) and the fuel fan heat exchanger (104) so that excess fuel is recirculated without reintroduction into the fuel reservoir (70).

23 Claims, 1 Drawing Sheet

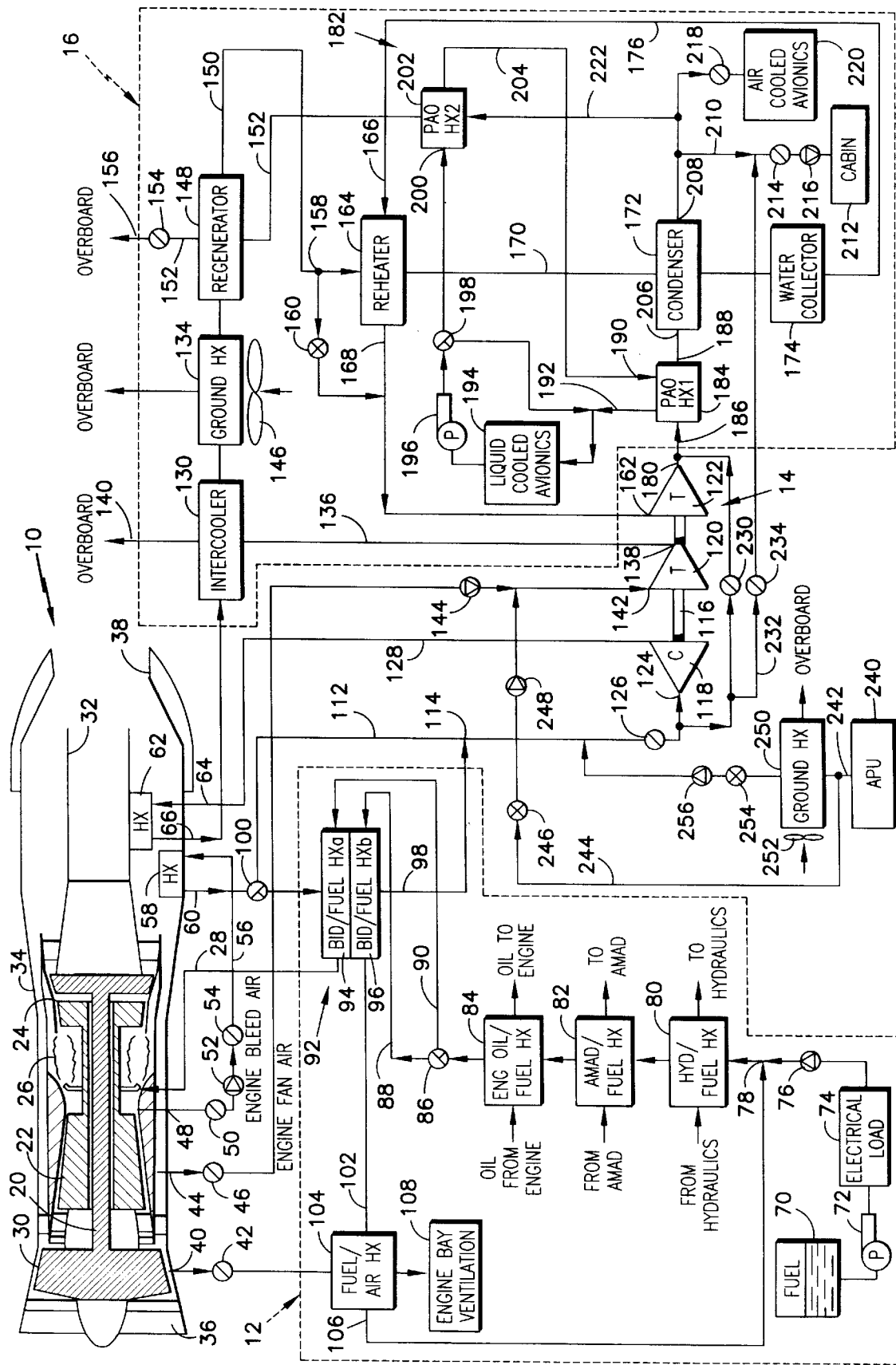

INTEGRATED THERMAL MANAGEMENT AND COOLANT SYSTEM FOR AN AIRCRAFT

FIELD OF THE INVENTION

This invention relates to an integrated thermal management and coolant system for an aircraft, particularly an aircraft having a turbo fan propulsion engine.

BACKGROUND OF THE INVENTION

Modern sophisticated aircraft require equally sophisticated systems for thermal management and cooling. In typical modes of operation of the aircraft, lubricating oil for the engine and hydraulic fluid used in the various hydraulic systems as well as the aircraft mounted accessory drive (AMAD) require cooling. At the same time, the avionic systems of the aircraft will require cooling during operation, some by a liquid coolant and others by cool air. Concurrently, at low altitude or on the ground or at other relatively high temperature operating environments, the aircraft cabin requires cooling while at relatively low temperature altitudes such as at cruise altitude for a jet aircraft, the cabin will require warming. Through all of this it is generally desirable to heat the fuel delivered to the main propulsion engines to maximize the efficiency of the engines.

A common thread in many prior art systems is the use of the air in which the aircraft is traveling as a sink into which heat is rejected. Most typically, this air is both so-called "ram air" and "bleed air". Ram air is, of course, air that is literally rammed into an inlet on the aircraft as a result of the aircraft's forward velocity through a body of air. A penalty paid for the use of ram air is the aerodynamic drag imposed on the aircraft as a result of the presence of one or more ram inlets.

In addition, the installation of ram air circuits in an aircraft so as to convey the ram air to a point of use is difficult. Moreover, in the case of aircraft intended for military use, ram air inlets all too often may provide an undesirable aircraft position indicating radar return because of their configuration.

Bleed air is air taken from the compressor section of a gas turbine engine, whether a main propulsion engine of the aircraft or a so-called APU or auxiliary power unit. A penalty paid for the use of bleed air is a reduction in operating efficiency of the engine from which the air is bled.

Many of these systems utilize aircraft fuel as a coolant prior to its combustion in an engine. The aircraft fuel cannot be heated to such a degree that it begins to "coke" and consequently, excess fuel is circulated to the components that it is to cool and that fuel not required by the engine is recirculated to the fuel reservoir. Not infrequently, this fuel, particularly in military usages, may be returned to another, larger storage reservoir, from which fuel is withdrawn to be put to uses other than that of driving the main propulsion engines of the aircraft. Because of that possibility, desirable additives for aircraft operation cannot be utilized in the fuel. For example, it is desirable to use additives that raise the temperature of the fuel at which coking begins to occur and the presence of such additives may not be desirable for all uses to which the fuel is put and can be expensive.

The present invention is directed to overcoming one or more of the above problems.

SUMMARY OF THE INVENTION

It is the principal object of the invention to provide a new and improved, integrated, thermal management and environmental cooling system. An exemplary embodiment of the invention contains a number of facets which, in a highly preferred embodiment, are all used together. However, in some instances, components giving but a single advantage may be employed exclusively without resort to the others or in such combinations as to achieve those of the advantages specifically desired.

According to one aspect of the invention, the system includes a fuel reservoir with a pump pumping fuel from the reservoir to a first heat load. A check valve is located downstream of the first heat load and upstream of a second heat load. The fuel, after being passed through the heat loads, is further heated by engine bleed air with part being diverted to the main propulsion engine for combustion therein and the remainder being recirculated through a heat exchanger cooled by fan air from an early stage of the engine and returned to the fuel line downstream of the check valve. Consequently, recirculation is not through the fuel tank and the problems associated with the return of recirculated fuel to the fuel reservoir or tank are avoided.

According to another aspect of the invention, the thermal management and coolant system avoids the use of ram air altogether by employing, when required, engine fan air from the fan duct of a turbo fan engine and engine bleed air from the compressor of the main engine core as the air utilized throughout the system in exclusion to ram air entirely.

According to the invention and another facet thereof, heat exchangers for cooling the air used as a working fluid in the system are located in the bypass or fan air duct of the engine to reduce the fuselage volume and to increase efficiency by rejecting heat to the fan or bypass air passing through the engine.

In another facet of the invention, fan air utilized in a heat exchanger to cool fuel that is being recirculated to the heat loads is discharged to the engine bay to provide positive bay ventilation and eliminate the need for separate engine bay ventilation circuits.

In still another aspect of the invention, the system employs a turbo machine having at least one turbine stage. Engine fan air is expanded in the one turbine stage, and thereby cooled while undergoing expansion, before being discharged to an early part of a thermal management network. The one turbine stage thereby lowers the temperature of the air being utilized as the sink for the system.

Additionally, the system of the invention, because it does not require ram air, may be located extremely close to the main propulsion engine to minimize ducting.

Other objects and advantages will become apparent from the following specification taken in connection with the accompanying drawings.

DESCRIPTION OF THE DRAWING

The FIGURE is a schematic of an integrated thermal management coolant system made according to the invention.

DESCRIPTION OF THE PREFERRED EMBODIMENT

An exemplary embodiment of an integrated thermal management system made according to the invention is illustrated in the FIGURE and will be described in the context of an aircraft having one or more jet main propulsion engines, specifically, turbo fan engines. However, in some instances, where engine bleed air may be substituted for engine fan air, or where only part of the system is employed and that does not require the use of fan air, any type of turbine based main propulsion engine could be employed.

As seen in the FIGURE, the system, including the main propulsion engine, includes four main components. Specifically, a turbo fan propulsion engine, generally designated 10, is illustrated. Also illustrated is what might be termed a fuel based system, generally designated 12. The fuel based thermal management system 12 utilizes fuel for the aircraft to cool various heat loads forming part of the aircraft.

A third component is a turbo machine, generally designated 14. The turbo machine expands the working fluid through one or more turbine stages to cool the same to a lower temperature so that it may more efficiently cool working fluid used elsewhere in the system. The turbo machine 14 also compresses the working fluid which, as noted earlier, is air, for use by the aircraft environmental control system (ECS).

A final major component is a thermal management network, generally designated 16. Within the network 16, the working fluid at various stages of expansion and compression are moved about in paths to be described to achieve the desired control of cabin temperature, provide air cooling for avionics, provide cooling for a liquid coolant loop which may cool other avionic systems, etc., etc.

Turning now the main propulsion engine 10, the same is seen to include a rotary shaft, schematically illustrated at 20 carrying several stages of compressor blades 22 and several stages of turbine blades 24. One or more combustors 26 are located in this engine 10 for combusting fuel received on a line 28 to provide gases of combustion to drive the turbine 24.

The shaft 20, forwardly of the compressor stages 22, also mounts several stages of fan blades 30. The arrangement is one of a conventional turbo fan jet propulsion engine. The compressor 22, the turbine 24 and the combustor 26 make up the main core of the engine 10 and gases of combustion expanded through the turbine 24 are discharged through a nozzle 32. Surrounding the engine core is a bypass or fan duct 34 which also surrounds the fan blades 30. As is well known, air under pressure admitted at the engine inlet 36 upstream of the fan blades 30 is not only compressed by the compressor 22, but by the fan blades 30 as well. The air that passes about the engine core is known as fan air or bypass air and is confined about the engine core by the duct 34. The same is discharged about the nozzle 32 at a nozzle designated 38.

The engine 10 includes an outlet 40 for fan air. The outlet 40 is connected to the interior of the fan duct 34 at an early stage of the fan section 30 of the engine 10 and to a modulating valve 42. It is desirable to locate the outlet 40 at an early stage since at that point, compression will be relatively minimal with a consequence that the temperature rise in the air being compressed by the fan 30 will also be relatively minimal. That is to say, the air will be cooler at the outlet 40 at the location shown than if it were located more downstream on the fan duct 34.

A further fan air outlet 44 is located downstream of the outlet 40 and likewise connects to a modulating valve 46 for purpose to be seen.

The engine 10 includes a bleed air outlet 48 connected to a late or final stage of the compressor 22. The outlet 48 provides engine bleed air from the compressor 22 to a modulating valve 50 which in turn is connected to a check valve 52 and a further modulating valve 54. A line 56 extends from the modulating valve 54 to a first fan duct heat exchanger 58 and specifically, to the downstream end of the heat exchanger 58 in relation to the fan duct 34. Thus, bleed air may be passed to the heat exchanger 58 and flow therein countercurrent to fan air flowing within the duct 34 to emerge from the first fan duct heat exchanger 58 on a line 60 for purposes to be seen.

A second fan duct heat exchanger 62 is likewise located within the fan duct 34 about the nozzle 32 and includes an inlet 64 as well as an outlet 66. Both of the heat exchangers 58 and 62 have internal flow paths that are in heat exchange relation with the air flowing in the fan duct 34 as will be seen. While both of the heat exchangers 58 and 62 have been shown and described as providing for countercurrent flow of a working fluid within each heat exchanger in relation to the flow of bypass air within the fan duct 34, concurrent flow, or cross flow, or combinations of the same could be utilized as desired, depending upon the heat exchange efficiency required of a given system. In any event, it can be seen that bypass air can be utilized as the sink for heat within the system being rejected through the heat exchangers 58 and 62. Additionally, the heat exchanger 62 need not be located downstream of the heat exchanger 58 as shown, if desired.

Returning now to the fuel based side 12 of the system, the same is seen to include a fuel reservoir or tank 70 for containing fuel to drive the engine 10. The fuel reservoir 70 is connected to a pump 72 which pumps the fuel to a first heat load 74 which is indicated as an electrical load but could be any sort of heat load requiring cooling. After cooling the first heat load 74, the fuel passes through a check valve 76 which allows flow in the direction of the arrow illustrated but not the reverse. The check valve 76 therefore discharges fuel to a junction 78.

From the junction, fuel passes through a series of heat exchangers, in the embodiment illustrated, a hydraulic fluid/fuel heat exchanger 80, an AMAD/fuel heat exchanger 82 and an engine oil/fuel heat exchanger 84. Of course, there may be greater or fewer of the heat exchangers 80, 82 and 84 dependent upon the aircraft systems requiring cooling. In the usual case, however, the hydraulic/fuel heat exchanger 80 will receive hydraulic fluid from the hydraulic systems of the aircraft to cool the same and then return the now cooled hydraulic fluid to those systems. Similarly, the AMAD/fuel heat exchanger 82 receives hydraulic fluid and/or lubricating oil from the AMAD, cools the same and returns it to the AMAD. In a like fashion, the engine oil/fuel heat exchanger 84 receives lubricating oil from the engine 10, cools the same and then returns the oil to the engine.

After passing through the heat exchangers 80, 82, 84, the fuel is discharged to a modulating three way valve 86 which divides the fuel into two streams, one placed on a line 88 and the other placed on a line 90. Of particular note is that the valve 86, in response to control signals provided elsewhere, proportions the fuel flow to the lines 88 and 90 for purposes to be seen.

The fuel side 12 also includes a bleed air/fuel heat exchanger, generally designated 92, made up of first and second bleed air/fuel heat exchanger cores 94 and 96 respectively. Each of the cores 94 and 96 include a fuel flow path in heat exchange relation with a bleed air flow path. The bleed air flow paths of the heat exchanger cores 94 and 96 are connected in series to discharge through a line 98. On their inlet side, the same are connected via a three way modulating valve 100 to the outlet 60 of the first fan duct heat exchanger 58.

The first bleed air fuel heat exchanger 94 has its fuel flow path connected to the line 90 and discharges to the line 28 to provide fuel to the combustors 26 for combustion within the engine 10. The second bleed air fuel heat exchanger 96 is connected to the line 88 and discharges to a fuel inlet 102 of a fuel/air heat exchanger 104. The fuel/air heat exchanger has an outlet 106 which is connected to the junction 78 as illustrated. In addition to the fuel flow path extending between the inlet 102 and outlet 106, the fuel/air heat exchanger 104 includes a flow path connected to the modulating valve 42 on its inlet side and on its outlet side to an engine bay 108 in which the engine 10 is located. As a consequence of this construction, cooling air is provided from an early fan stage of the engine 10 in quantities proportioned through operation of the valve 42 to the fuel/air heat exchanger 104 to cool fuel being recirculated through the second bleed air fuel heat exchanger 96 to the junction 78 as well as to provide air to the engine bay 108 at a pressure that is positive with respect to that area and provide for ventilation of the same. Thus, the need for a separate engine bay ventilation system is avoided while the fuel, after being utilized to cool aircraft fluids in the heat exchangers 80, 82 and 84, is recirculated after being cooled without being recirculated through the fuel reservoir 70. Thus, additives may be provided in the fuel to raise its coking temperature and allow the fuel to be provided to the engine 10 at a higher temperature to maximize engine efficiency. Further, there is no need to carry excess fuel as in some prior art systems. It will also be appreciated that the recirculation system described with the advantages just listed further provides the advantage of operation with no reliance whatsoever on ram air, thus reducing aerodynamic drag on the aircraft in which it is employed and allowing the use of lesser volume ram air inlets if ram air is required for other purposes with such lesser volume ram air inlets minimizing the effect on the radar cross section of the aircraft and reducing complexity and removing the doors used in typical ram air systems.

It will be observed that the ultimate temperature of the fuel applied to the engine 10 is controlled by the percentage of the total fuel flow directed through the first bleed air fuel heat exchanger core 94 as controlled by the valve 86, the flow of bleed air to the heat exchanger 58 as modulated by operation of the valve 126, and the flow of bleed air from the heat exchanger 58 to the bleed air fuel heat exchanger 92 as controlled by the valve 100. In this respect, it will be observed that the latter is a three way valve and can direct bleed air flow from the heat exchanger 58 to a bypass line 112 which connects to the line 98 at a point 114.

It should also be observed that the bleed air fuel heat exchanger 92 adds heat to the fuel flowing therethrough on the lines 88 and 90 so as to assure that fuel flowing to the engine 10 on the line 28 is at the most efficient, non-coking, elevated temperature allowed for system operation. It should be noted that with the addition of fuel additives for the purpose of raising the coking temperatures of fuels to higher temperatures than currently achievable with conventional technology, the heat exchanger 58 may be eliminated, with all bleed air cooling being achieved in the heat exchanger 92.

Further, an alternate configuration may be employed, depending on the physical design and particular materials employed in fabricating the valve 86. For example, the valve 86 may be located on the fuel outlet side of the heat exchanger 92. This results in a less complex construction of the heat exchanger. In this alternative construction, the fuel outlet side of the heat exchanger 84 would be connected directly to the fuel inlet side of the heat exchanger 92 while the fuel outlet side of the heat exchanger 92 would be connected to the valve 86. The valve 86 would be modulated to supply fuel to the combustor 26 and directly to the fuel/fan air heat exchanger 104.

Turning now to the turbo machine 14, the same, in the exemplary embodiment illustrated, includes a single shaft 116 on which a single rotary compressor stage 118 is mounted. First and second turbine stages 120 and 122 respectively, are also mounted on the shaft 116. However, it is specifically to be noted that coaxial shafts or other non-single shaft arrangements known in the art could be employed if desired.

The compressor 118 includes an inlet 124 connected via a modulating valve 126 to the junction 114. Thus, engine bleed air, after being cooled in the first fan duct heat exchanger 58 and directed to the junction 114 directly via the bypass 112 or via the bleed air fuel heat exchanger 92 is directed to the compressor stage 118. The compressor 118 includes an outlet line 128 which is connected to the inlet 64 of the second fan duct heat exchanger 62 to provide engine bleed air, after a further stage of compression, thereto. After being cooled in the second fan duct heat exchanger 62, this bleed air serves as the working fluid for the thermal management network 16 which is connected to the outlet 66 for the heat exchanger 62 as illustrated.

Turning to the thermal management network 16, the same includes an intercooler 130 or gas to gas heat exchanger.

Internally, the intercooler 130 includes two gas flow paths in heat exchange relation to each other. One flow path is connected to the outlet 66 of the second fan duct heat exchanger 62 and to a so-called ground heat exchanger 134. The other gas flow path within the intercooler 130 is connected via a line 136 to the outlet 138 of the first turbine stage 120 of the turbo machine 114. This same gas flow path discharges overboard as illustrated at 140. The first turbine stage 120 includes an inlet 142 connected via check valve 144 to the valve 46 and the bleed air outlet 44. Thus, bleed air from the main propulsion engine 10 is directed, at a flow rate modulated by the valve 46, to the first turbine stage 120. The turbine thus drives the compressor 118 as well as expands the bleed air. The expansion of the bleed air results in much cooler air exiting the first turbine stage 120 and being directed to the intercooler 130. Thus, working fluid entering the thermal management network as sink air is cooled by the intercooler 130 through the use of the turbo machine 14 which expands the sink air through the first turbine stage 120 to lower the temperature of the sink air.

If desired, provision may be made for the introduction of a ground heat exchanger 134 into the flow stream within the thermal management network 116. Typically, such a heat exchanger would be mounted on a wheeled ground cart or the like and have ambient air directed through it via a fan 146 to be discharged again to the ambient. It would be connected into the system only while the aircraft is on the ground by suitable flexible conduits.

From the ground heat exchanger 134, if used, working fluid is passed to a regenerator 148 and exits the same on a line 150. Further cooling of the working fluid occurs within the regenerator by reason of substantially spent working fluid being passed through the regenerator on a line 152 to a modulating valve 154 to be dumped overboard as illustrated at 156.

In any event, working fluid in the line 150 is directed to a junction 158. A bypass valve 160 connected to the junction 158 is operable, when open, to direct some part of the fluid in the line 150 directly to the inlet 162 of the second turbine stage 122. When the valve 160 is closed, all of the working fluid on the line 150 is directed to a heat exchanger in the form of a reheater 164. The reheater 164 is desirably included to increase system efficiency but is not absolutely necessary and may be omitted, if desired, for cost reduction.

In the reheater 164, the working fluid from the junction 158 passes through a flow path that is in heat exchange with a flow path extending from an inlet 166 to the reheater 164 to an outlet 168 thereof. Within the reheater 164, working fluid actually warms the fluid passing from the inlet 166 to the outlet 168.

The working fluid exits the reheater 164 on a line 170 and passes to a condenser 172. Within the condenser 172, the working fluid is cooled and to the extent it is cooled below its dew point, condensation of moisture will occur. That condensate will be collected by a water collector or condensate collector 174 on the outlet side of the condenser 172. To the extent that cold water might be usable on the aircraft as, for example, cooling components requiring water cooling or the like, the water separated in the water collector 174 may be utilized for the purpose. In some applications/installations the reheater 164 may be made as part of the condenser 172, thus eliminating duct 170.

The working fluid exiting the condenser 172 is returned on a line 176 to the inlet 166 of the reheater 164. Because the fluid was cooled substantially within the condenser 172, it is now reheated somewhat within the reheater 164 by the incoming working fluid and then applied to the inlet 162 of the second turbine stage 122. This working fluid will be relatively free of condensate and above the dew point of the working fluid. In this regard, the bypass valve 160 is utilized to bypass the condenser 172 only in low humidity conditions as, for example, when the aircraft is flying at high altitude (e.g., 30,000 ft.).

In all events, the working fluid is expanded in the second stage turbine 122 and directed therefrom via an outlet 180 at a very, very low temperature.

Within the thermal management network 16 is a liquid coolant loop, generally designated 182. A liquid coolant is flowed through the loop 182 and typically, but not always, will be a PAO fluid, that is, a polyalphaolefin heat transport fluid. Thus, a first coolant heat exchanger 184 has a liquid flow path designated by an inlet 186 and an outlet 188 and a liquid coolant flow path in heat exchange therewith. The liquid coolant flow path is defined by an inlet 190 and an outlet 192. The outlet 192 is connected to a heat load that requires liquid cooling as, for example, liquid cooled avionic systems 194. From there, the loop extends to a pump 196 which directs liquid coolant through a three way valve 198 whereby it may be returned directly to the outlet 192 of the heat exchanger 184 or provided to a coolant inlet 200 for a coolant flow path through a second coolant heat exchanger 202 to an outlet 204. The outlet in turn is connected to the inlet 190 of the first liquid coolant heat exchanger 184 to complete the loop 182.

The second liquid coolant heat exchanger 202 has a second fluid flow path in heat exchange relation with that defined by the inlet 200 and the outlet 204 which acts as part of the line 152 and connects to the regenerator 148 to provide the aforementioned cooling action of the working fluid therein.

Returning to the first liquid coolant heat exchanger 184, the outlet 188 thereof is connected to a flow path through the condenser defined by an inlet 206 and an outlet 208. Thus, cold expanded air from the turbine stage 122, after being directed through the first liquid coolant heat exchanger 184, is passed through the condenser 172 to cool the incoming working fluid and cause condensation of moisture therein. After emerging from the condenser from the outlet 208, the relatively cooled air is directed to a line 210 which is connected to the aircraft cabin 212 via a modulating valve 214 and a check valve 216. Thus, cold air is provided from the condenser 208 to the cabin 212 for cooling purposes.

The cool air from the condenser 208 may also be directed to a modulating valve 218 which directs the flow of such air to air cooled avionics 220 for cooling purposes. Finally, the air from the condenser 208 may be passed to a line 222 connected to the regenerator 148 via the second liquid coolant heat exchanger 202 to provide for further cooling of the liquid coolant used to cool the liquid cooled avionics 194.

The system may also include, if desired, a line with a modulating valve 230 interconnecting the inlet 124 of the compressor 118 and the inlet 186 of the first liquid coolant heat exchanger 184. The valve 230 may be operated to cause the bypassing of the turbo machine 114 in selective amounts.

Also included is a line 232 extending from the valve 126. The line 232 also connects to the modulating valve 214 and includes its own modulating valve 234.

Those skilled in the art will readily appreciate that the temperature of bleed air at the valve 126 will be considerably higher than that at the outlet 208 of the condenser 172. Those skilled in the art will also recognize that with environmental control systems operating at altitude, it is almost always necessary to warm the air flowing to the cabin or other components rather than cool it. Thus, by selective operation of the valve 234, relatively warm air may be fed to the cabin 212 to be mixed with cool air from the condenser 172 to achieve a desired temperature balance.

To make full effective use of the system, in some instances, it may be desirable to construct the same so as to be usable employing bleed air from an auxiliary power unit or APU. An APU is schematically illustrated at 240 and includes a bleed air output 242. The bleed air at the outlet 242 may be directed through a line 244 through an off/on valve 246 and a check valve 248 to the inlet 142 of the first turbine stage 120. It thus may be used to replace bleed air received from the main engine 10 at the bleed air outlet 44.

If desired, the arrangement may be such as to accommodate a further ground heat exchanger 250 on a ground cart or the like. A fan 252 blows ambient air through the ground heat exchanger 250 so as to cool bleed air received from the bleed air outlet 242. The bleed air is then passed through an on/off valve 254 and a check valve 256 to the line 112 at a location just upstream of the modulating valve 126. Thus, bleed air with some cooling from the APU 240 may be provided to the inlet 124 of the compressor 118 in lieu of bleed air with some cooling provided to the same location from the bleed air outlet 48 and the first fan duct heat exchanger 58.

From the foregoing, it will be appreciated that a system made according to the invention has a number of advantages. Engine fan air is used as a heat sink for many of the sub-systems and thereby eliminates the need for the more typically employed ram air inlets and heat exchangers. The system facilitates the use of fuel additives that cannot be desirably returned to the tank by recirculating fuel used for cooling purposes in a path that does not include the tank. It allows the use of a simple and inexpensive turbo machine such as the turbo machine 14 wherein all components may be on a single shaft. Heat exchangers utilizing bypass air as a sink are located in the bypass or fan duct to reduce fuselage volume while increasing efficiency through the rejection of heat to the bypass or fan air.

The system eliminates any need for separate engine bay ventilation circuits and an improvement in efficiency is involved in the expansion of the sink air in the turbo machine to lower the temperature of the sink air and improve heat transfer.

It will also be readily appreciated that the system may be physically located close to the engine to minimize ducting as its location is totally independent of the location of ram air sources.

The system provides a means of heating the fuel to achieve maximum efficiency yet while at the same time avoiding undesirable coking of the fuel. Fuel recirculation is, as mentioned previously, not through the fuel tank allowing use of additives and providing the further advantage of not heating fuel in the fuel tank by relatively warmer recirculating fuel which would lower system efficiency. It further eliminates the need to carry extra fuel to absorb all of the heat that must be rejected from the aircraft.

As noted earlier, where lesser efficiencies can be tolerated in exchange for lower cost, the reheater 164 may be eliminated. In some instances, the bleed air fuel heat exchanger, and both bleed air/fuel cores 94, 96 thereof, may also be eliminated. The provision for the ground air heat exchangers 144 and 252 is optional.

What is claimed is:

1. An integrated thermal management and coolant system for an aircraft including a turbo fan jet propulsion engine having a fan, a main engine core including a compressor and a main engine core bypass duct, comprising:
    a fuel reservoir;
    a pump for pumping fuel from the reservoir;
    a first heat load connected to said pump to receive fuel pumped by said pump and to be cooled by the fuel;
    a check valve downstream from said first heat load and upstream of a junction;
    at least one second heat load connected to said junction;
    a fuel/fan air heat exchanger having a fan air flow path in heat exchange relation with a fuel flow path having a fuel discharge end connected to said junction, said fan air flow path adapted to be connected to receive compressed air from the fan of the engine;
    a bleed air/fuel heat exchanger having a fuel flow path and a bleed air flow path in heat exchange relation with one another, the bleed air flow path being adapted to be connected to the main engine core to receive bleed air from the compressor thereof, said bleed air/fuel flow path being connected, at one end, to deliver fuel to said main engine core to be combusted therein and to said fuel/fan air heat exchanger to deliver fuel thereto for cooling and return to said junction; and
    a control valve interposed between said second heat load and said main engine core for proportioning the flow of fuel to said main engine core and said fuel/fan air heat exchanger;
    whereby excess fuel is recirculated without reintroduction into said fuel reservoir and fuel at a desired elevated temperature is delivered to said main engine core.

2. The system of claim 1 wherein said bleed air/fuel heat exchanger has two said bleed air/fuel heat exchanger fuel flow paths, one connected to said main engine core and one connected to said fuel/fan air heat exchanger; and said control valve is located between said bleed air/fuel heat exchanger and said second heat load to proportion fuel flow between said two fuel flow paths of said bleed air/fuel heat exchanger.

3. The system of claim 2 wherein said bleed air/fuel heat exchanger includes two heat exchanger cores, each having part of said bleed air flow path and one of said two bleed air/fuel heat exchanger fuel flow paths.

4. The system of claim 1 further including a first fan duct heat exchanger adapted to be disposed in said fan duct and having a bleed air flow path connected to receive said bleed air from the compressor and deliver said bleed air to said bleed air/fuel heat exchanger and in heat exchange relation with fan air in said fan duct.

5. The system of claim 1 wherein the aircraft includes an engine bay for containing said turbo fan jet propulsion engine and said fuel/fan air heat exchanger fan air flow path, downstream of said fuel/fan air heat exchanger fuel flow path, is connected to discharge fan air into said engine bay to provide ventilation of said engine bay.

6. An integrated thermal management and coolant system for an aircraft including a turbo fan jet propulsion engine having a fan, a main engine core including a compressor and a main engine core bypass duct, comprising:
    a fuel reservoir;
    a pump for pumping fuel from the reservoir;
    a heat load connected to said pump to receive fuel pumped by said pump and to be cooled by the fuel;
    a bleed air/fuel heat exchanger having a fuel flow path and a bleed air flow path in heat exchange relation with one another, the bleed air flow path being adapted to be connected to the main engine core to receive bleed air from the compressor thereof, said bleed air/fuel heat exchanger fuel flow path being directly connected at one end, to deliver fuel to said main engine core to be combusted therein; and
    a first fan duct heat exchanger adapted to be disposed in said fan duct and having a first bleed air flow path connected to receive said bleed air from the engine compressor and deliver said bleed air to said first bleed air/fuel heat exchanger and in heat exchange relation with fan air in said fan duct.

7. The system of claim 6 further including a turbo machine having a compressor coupled to at least a first turbine stage and having an inlet and an outlet, said bleed air/fuel heat exchanger having its bleed air flow path connected to said turbomachine compressor inlet; a second fan duct heat exchanger adapted to be disposed in the fan duct and having a second bleed air flow path connected to said turbomachine compressor outlet for receiving air therefrom and being in heat exchange relation with fan air in said fan duct; and a thermal management network, connected to an outlet of said second fan duct heat exchanger to receive air therefrom.

8. The system of claim 7 wherein said thermal management network includes an intercooler connected to said second fan duct heat exchanger with an intercooler bleed air flow path in heat exchange relation with a first stage turbine flow path, said first stage turbine flow path being connected to an outlet of said turbomachine first turbine stage.

9. The system of claim 8 wherein said turbomachine includes a second turbine stage coupled to said first turbine stage, said intercooler bleed air flow path being connected to an inlet of said second turbine stage.

10. The system of claim 9 wherein said thermal management network includes a liquid cooled heat load, a liquid coolant loop including said liquid cooled heat load, a pump in said loop and a first coolant heat exchanger connected to an outlet of said second turbine stage.

11. The system of claim 10 wherein the aircraft includes a cabin connected to an outlet of said first coolant heat exchanger.

12. The system of claim 11 wherein the cabin is connected to said outlet of said first coolant heat exchanger by a first flow path in a condenser.

13. The system of claim 12 wherein said condenser includes a second flow path in heat exchange relation with said condenser first flow path, said second condenser flow path being connected to said intercooler bleed air flow path and to said turbine second stage inlet.

14. The system of claim 13 further including a selectively operable bypass for bypassing at least some of the flow from said intercooler bleed air flow path past said condenser to said turbine second stage inlet.

15. The system of claim 13 further including a condensate collector interconnecting said turbine second stage and said condenser second flow path.

16. The system of claim 10 wherein said system includes an air cooled heat load connected to an outlet of said first coolant heat exchanger.

17. The system of claim 10 further including a second coolant heat exchanger in said loop upstream of said first coolant heat exchanger and connected to said turbine second stage outlet by said first coolant heat exchanger.

18. The system of claim 17 including a condenser having a first flow path interconnecting said first and second coolant heat exchanger.

19. The system of claim 18 wherein said condenser includes a second flow path in heat exchange relation with said condenser first flow path, said second condenser flow path being connected to said intercooler bleed air flow path and to said turbine second stage inlet.

20. The system of claim 19 further including a regenerator having a first flow path interconnecting said intercooler bleed air flow path with said condenser second flow path and a second flow path connected to said second coolant heat exchanger.

21. An integrated thermal management and coolant system for an aircraft including a turbofan propulsion engine including an engine core having a compressor and a turbine and a fan driven by the turbine, and a fan air duct about the core and the fan, comprising:

a thermal management network including an environmental control system and at least one heat load requiring cooling and a gas to gas intercooler having a first gas flow path in heat exchange relation with a second gas flow path and adapted to provide a gaseous coolant to the network for utilization thereby to provide cooling for said environmental control system and said at least one heat load;

a turbo machine having at least one turbine stage with an inlet and an outlet;

a first conduit in fluid communication with said fan air duct for receiving engine fan air therefrom and connected to an inlet of said one turbine stage; and a second conduit connected to said one turbine stage outlet and to said first gas flow path for conducting engine fan air expanded, and thereby cooled, by said one turbine stage to said first gas flow path to cool gas flowing in said second gas flow path.

22. The system of claim 21 wherein said at least one heat load is part of a liquid coolant loop and further including at least one gas/liquid heat exchanger in said loop and connected to said second gas flow path.

23. The system of claim 22 further including a second turbine stage having an inlet connected to said second gas flow path and an outlet connected to said gas/liquid heat exchanger.

* * * * *